United States Patent [19]

Hoheisel

[11] Patent Number: 4,505,982

[45] Date of Patent: Mar. 19, 1985

[54] SHAPED BODY HAVING GOOD LONG-TERM THERMAL STABILITY AND CONTAINING FLUOROHYDROCARBON POLYMERS

[75] Inventor: Klaus Hoheisel, Wiesbaden, Fed. Rep. of Germany

[73] Assignee: Hoechst Aktiengesellschaft, Frankfurt am Main, Fed. Rep. of Germany

[21] Appl. No.: 327,573

[22] Filed: Dec. 4, 1981

[30] Foreign Application Priority Data

Dec. 5, 1980 [DE] Fed. Rep. of Germany ....... 3045844

[51] Int. Cl.³ .................. B32B 27/00; D02G 3/00
[52] U.S. Cl. .................... 428/421; 428/422; 428/364; 428/373; 428/910; 525/151; 525/185; 525/187; 525/931
[58] Field of Search .......... 428/421, 422, 910, 920, 428/364, 373, 98; 525/151, 165, 178, 180, 189, 185, 187, 931

[56] References Cited

U.S. PATENT DOCUMENTS

| | | | |
|---|---|---|---|
| 3,290,412 | 12/1966 | Goldblum | 525/147 |
| 3,294,871 | 9/1964 | Schmitt | 525/178 |
| 3,652,409 | 3/1972 | Mack et al. | |
| 3,941,860 | 3/1976 | Couchoud et al. | 264/210.7 |
| 4,076,889 | 2/1978 | Sasaki et al. | 428/421 |
| 4,356,284 | 10/1982 | Kutnyak et al. | 428/421 |

OTHER PUBLICATIONS

J. Brandrup et al., Ed., *Polymer Handbook*, 1966, Table IX-1, John Wiley & Sons, NY.
Herman F. Mark et al., "Degradation," *Encyclopedia of Polymer Science and Technology*, vol. 4, p. 648.

*Primary Examiner*—Marion E. McCamish
*Assistant Examiner*—Beverly K. Johnson
*Attorney, Agent, or Firm*—Schwartz, Jeffery, Schwaab, Mack, Blumenthal & Koch

[57] ABSTRACT

Disclosed is a shaped body exhibiting good long-term thermal stability, comprising at least one fluorohydrocarbon polymer which can be processed by melting, and at least one heat-resistant thermoplastic polymer, wherein at least the fluorohydrocarbon polymer forms a phase which is coherent or at least largely coherent. The weight ratio of the fluorohydrocarbon polymer to the thermoplastic polymer preferably varies between about 80:20 and about 20:80. The shaped body is preferably a film used as a layer of insulation.

17 Claims, No Drawings

SHAPED BODY HAVING GOOD LONG-TERM THERMAL STABILITY AND CONTAINING FLUOROHYDROCARBON POLYMERS

BACKGROUND OF THE INVENTION

The present invention relates to a shaped body, preferably in the form of a flat film, which contains fluorohydrocarbon polymers, which exhibits good long-term thermal stability and which has improved mechanical properties, as compared with shaped bodies known from the state of the art. The present invention also provides for the use of the shaped body in electrical applications.

The known films of fluorohydrocarbon polymers often have long-term thermal stability values which fall within the VDE heat classes B, F or higher. However, if they are to be used as insulating materials, e.g., for motor insulating purposes, they must fulfill further requirements concerning special mechanical properties, such as resistance to penetration, folding strength and stiffness. In films of this type, however, these properties are not present at all, or are present only to an unsatisfactory degree.

It is generally known to improve some of the mechanical properties, in particular the strength and hardness, of shaped bodies made of plastic materials by embedding into them materials in the form of threads, fibers or platelets. However, the effects achieved by this means are very small and insufficient in the case of substantially non-three-dimensional shapes, such as, in particular, films. Besides, most of these additives are of an inorganic nature. They are, e.g., made of glass, carbon, metal, boron, metal oxides, nitrides or silicates, such as asbestos or mica. Additives of this kind are disadvantageous since, at the high temperatures arising during the processing, they are chemically reactive toward polymers containing fluorine, so that a degradation of the polymers results. Furthermore, the reactions can be accompanied by vigorous reactions releasing heat and gas, and therefore they represent a considerable source of hazards in industrial practice. Apart from that, losses in toughness, such as, e.g., a reduced resistance to tear propagation of the shaped bodies, particularly films, formed of fluorohydrocarbon polymers, are observed when such additives are used.

A known means for improving the mechanical properties, especially of films, consists in combining them with other layers having better mechanical properties, e.g., other films; knitted, woven or non-woven fabrics; coatings or, other layers in coextruded materials. However, the considerable technical expense and costs characteristic of this approach are serious disadvantages to its practical use. Apart from that, if good long-term thermal stability is required of the layer components also, then relatively few and, in most cases, rather expensive materials, e.g., the aromatic polyimides, are suitable for this purpose. For the remaining layers, which are not long-term thermally stable, it is difficult to obtain a firm and lasting bonding strength between the fluorohydrocarbon polymers and the above-mentioned layers, due to the extremely abhesive properties of the fluorohydrocarbon polymers. In practice, this becomes apparent by a disturbing tendency of the composites to delaminate.

SUMMARY OF THE INVENTION

Therefore, it is an object of the present invention to provide shaped bodies, especially films, containing fluorohydrocarbon polymers which exhibit both high long-term thermal stability and good mechanical properties with regard to their use as insulating materials.

In accomplishing the foregoing objects, there has been provided in accordance with the present invention a shaped body exhibiting good long-term thermal stability, comprising at least one fluorohydrocarbon polymer which can be processed by melting, and at least one heat-resistant thermoplastic polymer, wherein at least the fluorohydrocarbon polymer forms a phase which is continuous or at least essentially continuous. Preferably, the weight ratio of the fluorohydrocarbon polymer to the thermoplastic polymer varies between about 80:20 and about 20:80, more preferably between about 70:30 and about 50:50.

In a preferred embodiment, the shaped body comprises a flat or tubular film. In another embodiment, the shaped body is in the form of threads and/or fibers which are suitable for fabrication into knitted, woven or non-woven fabrics for insulation requiring long-term thermal stability. In still another embodiment, the invention comprises an electrical appliance, comprising a layer of insulation, wherein the layer of insulation comprises a shaped body as defined above.

Further objects, features and advantages of the invention will become apparent from the detailed description of preferred embodiments which follows.

DETAILED DESCRIPTION OF PREFERRED EMBODIMENTS

The invention pertains to a shaped body exhibiting good long-term thermal stability and containing fluorohydrocarbon polymers. A body of this type is characterized in that it is built up of at least one fluorohydrocarbon polymer which can be processed by melting and at least one heat-resistant thermoplastic material, whereby at least the fluorohydrocarbon polymer forms a coherent or at least largely coherent phase.

Suitable fluorohydrocarbon polymers which can be processed by melting are the known fluorine-substituted vinyl polymers, such as, e.g., the homopolymers polyvinylidene fluoride and polyvinyl fluoride or the corresponding copolymers which, e.g., are derived from vinylidene fluoride, vinyl fluoride, tetrafluoroethylene, perfluoroalkyl vinyl ethers and the like, or copolymers of one or several of these fluorine-containing monomers and copolymerizable monomers which are free from fluorine, such as, e.g., ethylene.

The fluorohydrocarbon polymers preferably used are polyvinylidene fluoride and the copolymers of tetrafluoroethylene with hexafluoropropylene or ethylene. These can also be used in types which are chemically slightly modified. Among these, special preference is given to the tetrafluoroethylene/ethylene copolymer types which are particularly suitable. Proportions of fluorohydrocarbon polymers, which are not markedly thermoplastic, such as polytetrafluoroethylene, are also allowed, but in quantities and distributions which do not adversely influence the thermoplastic processing and phase formation.

Suitable thermoplastic heat resistant polymers are available in several polymer and heat classes, e.g., the polyesters, polycarbonates, polyamides, polyimides, polysulfones, polyether sulfones, polyketones, polyether ketones or polyethers, whereby complete inertness is a prerequisite, i.e., polymer properties which do not affect the properties during use, as would e.g., higher water absorption values. Preferred thermoplastic polymers are the linear, saturated polyesters of aromatic dicarboxylic acids, e.g., polybutylene terephthalate and, in particular, polyethylene terephthalate, and also the polycarbonates of aromatic dihydroxy compounds, especially of bisphenol A.

The weight ratios of the fluorohydrocarbon polymers to the thermoplastic polymers vary between about 80:20 and 20:80, with ratios of between about 70:30 and 50:50 being preferred.

The mixtures from which the shaped bodies are prepared are processed by means of conventional melting methods. The process is performed in a separate process step or directly in the extruder used for producing the shaped bodies, especially for producing films.

In accordance with this invention, it is essential that the shaped body is prepared in a way such that at least the fluorohydrocarbon polymer forms a coherent or at least largely coherent phase, which can be achieved, e.g., by appropriately choosing the viscosity of the components. The shaped body preferably is manufactured as a film. The films may be produced as flat films or as tubular films. Monoaxial or biaxial stretching of the films, optionally in combination with heat setting, is also possible, but in general, useful film properties are obtained without any stretching processes.

Bonding, laminating, printing, coating, metallizing, and the like, of the shaped body, in particular of the film, can be performed by means of conventional pretreatment processes, such as corona treatment, flame treatment, or treatment with oxidizing agents, caustic agents, solvents or swelling agents. It has been found, however, that even without any treatment, the products prepared in accordance with this invention usually possess an adhesion to printing inks, adhesives and other substances, which is markedly improved, as compared with shaped bodies which have been made of the basic pure fluorohydrocarbon polymers.

If appropriate, additives, such as, e.g., lubricants, slipping agents, anti-blocking agents, stabilizers, light or UV absorbers, crosslinking agents, plasticizers, fillers in the form of powders, fibers, platelets, micro-beads or irregularly shaped grains, flatting agents, dyestuffs, flame retardants, antistatic agents, reinforcing agents, electrical conductivity-improving agents, and the like can be added to the mixtures. The conventional additives are used in conventional amounts.

Surprisingly, the problem faced by the prior art can be very advantageously solved by means of the shaped bodies according to this invention. The use of these shaped bodies is advantageous to other fields of application also, e.g., in the manufacture of cables or flat cables, as base materials for printed circuits, and the like. When the thermoplastic polymer is eluted, porous products are obtained which, e.g., are suitable for separations where good thermal stability and/or chemical inertness are required. It is also possible, however, to melt-spin the component mixture to thereby produce threads or fibers which are fashioned into knitted, woven or non-woven fabrics and then are used for insulation purposes where long-term thermal stability is required.

The present invention will now be illustrated by the following non-limiting exemplary embodiments.

EXAMPLE 1

By means of a conventional mixer, a copolymer of tetrafluoroethylene and ethylene, produced by HOECHST AKTIENGESELLSCHAFT and commercially available under the name Hostaflon ET ® (of a molar monomer ratio of about 1:1 and a small chemical modification, $MFI_{11/300}$ 35 g/10 min) is mixed with polyethylene terephthalate (IV value 0.67, measured in a 3:2 mixture of phenol and tetrachloroethane, at 25° C.), in a weight ratio of 8:2, wherein the components are present in the form of granules.

After drying under customary conditions, the mixture is extruded to give a flat film having a thickness of 250 µm, by means of an experimental extruder equipped with a slot die and a chill roll, the temperatures of the heating zones of the extruder ranging between 290° C. and 310° C., and the output amounting to 15 kg/hour.

The film shows a two-phase structure, with a coherent fluorohydrocarbon polymer base. In contrast with a correspondingly prepared film which does not contain the polyester additive, the film prepared in accordance with the invention is foldable, shows good machinability, and can be readily shaped in an automatic wedge forming equipment of the Statomat type. Its resistance to penetration is between 75° C. and 130° C. higher than that of the comparative film (determined by a dimensional stability test under pressure and thermal load in accordance with VDE 0345 §26). Concerning the long-term thermal stability, determined in accordance with VDE 0304 part 2, using the criteria of ultimate tensile strength and elongation at rupture, there is observed practically no deterioration, as compared with a film made of the pure fluorohydrocarbon polymer, despite the relatively great proportion of additive contained in the film according to this invention and the reduced thermal stability of this additive. The resistance to tear propagation of the film is excellent; the modulus of elasticity is elevated from about 100 to about 1,200 $N/mm^2$. No disadvantages in the electrical properties can be detected, as compared with the comparative film. The film according to the invention can be bonded with commercially available adhesives, which are not among the special products for fluorohydrocarbon polymers.

EXAMPLE 2

Example 1 is repeated except that the weight ratio of the mixture is 6:4, and that a polyethylene terephthalate having a higher molecular weight (IV value 0.91) is used. The film has a coherent fluorohydrocarbon polymer phase and its long-term thermal stability is as high as that of the fluorohydrocarbon polymer film. The mechanical properties equal or even exceed those of the film described in Example 1.

EXAMPLE 3

The properties of this film are similar to those of the film of Example 2. The film is prepared in accordance with Example 1, except that the weight ratio of the mixture is 1:1, the fluorohydrocarbon polymer has a melt viscosity ($MFI_{11/300}$) of 400 g/10 min, and the polyethylene terephthalate has an IV value of 0.86. The film shows a coherent fluorohydrocarbon phase.

EXAMPLE 4

Example 3 is repeated, with the exception that the fluorohydrocarbon polymer has an MFI of 100 g/10 min. A film is obtained, the fluorohydrocarbon polymer of which has a coherent phase build-up, and which exhibits the same good technical properties as the film of Example 3.

EXAMPLE 5

Example 1 is repeated, with the exception that instead of polyethylene terephthalate, a polycarbonate of 4,4'-dihydroxydiphenyl-2,2-propane (bisphenol A) of an average molecular weight of about 50,000 (marketed under the designation Makrolon ®, by Bayer AG) is used. The fluorohydrocarbon polymer phase of the film is coherent. The relevant use properties of the film are excellent.

EXAMPLE 6

Example 5 is repeated, with the exception that the weight ratio is 4:6. The phase build-up of the film remains unchanged; its properties are excellent.

EXAMPLE 7

Example 5 is repeated, with the exception that the weight ratio is 2:8. The phase build-up and the properties of the film are similarly as good as those of the film prepared in accordance with Example 6.

A shaped body having good long-term thermal stability is a shaped body which is composed of a material which, in the form of a film, belongs to VDE heat class B or higher.

A fluorohydrocarbon polymer which can be processed by melting is a polymer which can be processed into a shaped body without showing any substantial decomposition in the molten state.

A heat-resistant polymer is a polymer which, at least during the processing of the polymer mixture comprising this polymer and said fluorohydrocarbon polymer into a shaped body, does not decompose substantially.

What is claimed is:

1. A shaped body exhibiting good long-term thermal stability and high mechanical strength, comprising:
   at least one fluorohydrocarbon polymer which can be processed by melting; and
   at least one heat-resistant thermoplastic polymer, wherein the shaped body comprises two phases which are non-homogeneous with one another and at least said fluorohydrocarbon polymer forms a phase which is at least essentially continuous.

2. A shaped body as described in claim 1, wherein at least said fluorohydrocarbon polymer forms a phase which is continuous.

3. A shaped body as described in claim 1, wherein said fluorohydrocarbon polymer is selected from a group consisting of polyvinylidene fluoride, a tetrafluoroethylene/ethylene copolymer and a tetrafluoroethylene/hexafluropropylene copolymer.

4. A shaped body as described in claim 3, wherein said fluorohydrocarbon polymer comprises a tetrafluoroethylene/ethylene copolymer.

5. A shaped body as described in claim 4, wherein said heat-resistant thermoplastic polymer is selected from a group consisting of a polyester, a polycarbonate, a polyamide, a polyimide, a polysulfone, a polyether sulfone, a polyketone, a polyether ketone, and a polyether.

6. A shaped body as described in claim 5, wherein said polyester comprises a linear, saturated polyester.

7. A shaped body as described in claim 5, wherein said heat-resistant thermoplastic polymer is selected from a group consisting of polyethylene terephthalate and a polycarbonate of a dihydroxy compound.

8. A shaped body as described in claim 7, wherein said polycarbonate comprises bisphenol A.

9. A shaped body as described in claim 1, wherein said heat-resistant thermoplastic polymer comprises an inert thermoplastic polymer.

10. A shaped body as described in claim 1, further comprising an additive selected from the group consisting of a lubricant, a slipping agent, an anti-blocking agent, a light absorber, a UV absorber, a cross-linking agent, a flattening agent, a color-protecting agent, a flame-retardant, a dyestuff, a plasticizer, a filler, a conductance-improving agent and an antistatic agent.

11. A shaped body as described in claim 1, wherein the shaped body comprises a film.

12. A shaped body as described in claim 11, wherein said film is monoaxially or biaxially stretched.

13. A shaped body as described in claim 1 wherein the shaped body comprises a fiber.

14. A shaped body as described in claim 1 wherein the shaped body is a thread.

15. A shaped body as described in claim 1, wherein the shaped body is formed by melt blending a mixture comprising said fluorohydrocarbon polymer and said thermoplastic polymer.

16. A shaped body as described in claim 1, wherein the weight ratio of said fluorohydrocarbon polymer to said thermoplastic polymer varies between about 80:20 and about 20:80.

17. A shaped body as described in claim 16, wherein said weight ratio of said fluorohydrocarbon polymer to said thermoplastic polymer varies between about 70:30 and about 50:50.

* * * * *

UNITED STATES PATENT AND TRADEMARK OFFICE
CERTIFICATE OF CORRECTION

PATENT NO. : 4,505,982

DATED : March 19, 1985

INVENTOR(S) : Klaus Hoheisel

It is certified that error appears in the above—identified patent and that said Letters Patent is hereby corrected as shown below:

Column 5, line 42, after "melting" please insert --, wherein said fluorohydrocarbon polymer is a fluorine-substituted vinyl polymer selected from the group consisting of polyvinylidene fluoride homopolymer, polyvinyl fluoride homopolymer and copolymers of fluorine-substituted vinyl monomers--.

Column 6, line 3, kindly delete "hexafluropropylene" and insert --hexafluoropropylene--.

Signed and Sealed this

Seventeenth Day of September 1985

[SEAL]

Attest:

DONALD J. QUIGG

Attesting Officer

Commissioner of Patents and Trademarks—Designate